United States Patent
Gill

(10) Patent No.: US 7,857,365 B2
(45) Date of Patent: Dec. 28, 2010

(54) VEHICLE BUMPER ASSEMBLY

(75) Inventor: Faheem Gill, Ann Arbor, MI (US)

(73) Assignee: Toyota Motor Engineering & Manufacturing North America, Inc., Ann Arbor, MI (US)

( * ) Notice: Subject to any disclaimer, the term of this patent is extended or adjusted under 35 U.S.C. 154(b) by 241 days.

(21) Appl. No.: 12/352,063

(22) Filed: Jan. 12, 2009

(65) Prior Publication Data

US 2010/0176609 A1    Jul. 15, 2010

(51) Int. Cl.
*B60R 19/18*    (2006.01)
*B60R 19/03*    (2006.01)

(52) U.S. Cl. ........................ 293/120; 293/132

(58) Field of Classification Search .......... 293/120, 293/122, 131, 132, 135, 136, 147, 148, 152, 293/155
See application file for complete search history.

(56) References Cited

U.S. PATENT DOCUMENTS

| | | | |
|---|---|---|---|
| 4,095,831 A * | 6/1978 | Hagiwara et al. | 293/155 |
| 4,386,799 A * | 6/1983 | Molnar | 293/120 |
| 4,460,205 A * | 7/1984 | Glance | 293/120 |
| 4,620,736 A * | 11/1986 | Shanks | 293/155 |
| 5,108,138 A * | 4/1992 | Kawaguchi | 293/120 |
| 5,577,784 A | 11/1996 | Nelson | |
| 6,923,484 B2 * | 8/2005 | Braun et al. | 293/155 |
| 2005/0046206 A1 | 3/2005 | Ohno et al. | |

* cited by examiner

*Primary Examiner*—Lori L Lyjak
(74) *Attorney, Agent, or Firm*—Garrana Tran LLP

(57) ABSTRACT

A vehicle bumper assembly is provided with a bumper cover attachable to a body of a vehicle, the bumper cover having an inner surface defining a groove portion. The vehicle bumper assembly further provides an energy absorbing member with a base to be fixedly secured to a bumper of a vehicle and a bracket coupled to the body of the vehicle, the bracket defining a protrusion portion to engage with the groove of the bumper cover.

20 Claims, 5 Drawing Sheets

US 7,857,365 B2

VEHICLE BUMPER ASSEMBLY

BACKGROUND

1. Technical Field

The present disclosure relates generally to a vehicle bumper assembly and, more specifically, to a vehicle bumper assembly for preventing the pinching of a body part against a vehicle door.

2. Background Information

The front and rear ends of a motor vehicle typically comprise a bumper and bumper cover which form the outer appearance of the vehicle. A bumper may serve the purpose of absorbing impact experienced at either end of the vehicle during a collision. In a vehicle, such as a hatchback or sport utility vehicle (SUV), the downward movement of the rear door toward a closing position may result in an obstruction by an object or body part against the bumper cover and/or the rear door. In some situations, a body part (e.g., finger) of an individual may be pinched or jammed against the rear door upon its closure. Generally, it is undesirable for an individual to experience a finger jam or pinch upon the closing of a rear vehicle door. Thus, a need exists for an assembly to prevent the pinching of a body part upon the closing of a rear door of a vehicle.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the present disclosure is a vehicle bumper assembly provided with a bumper cover attachable to a body of a vehicle, the bumper cover having an inner surface defining a groove portion. The vehicle bumper assembly further provides an energy absorbing member with a base to be fixedly secured to a bumper of a vehicle and a bracket coupled to the body of the vehicle, the bracket defining a protrusion portion to engage with the groove of the bumper cover.

Another aspect of the present disclosure is a vehicle which is provided with a body forming a bumper, a bumper cover having an inner surface defining a groove portion, wherein the bumper cover is in contact in with an outer surface of the bumper, an energy absorbing member with a base to be fixedly secured to the bumper and a bracket coupled to the energy absorbing member wherein the bracket defines a protrusion portion to engage with the groove portion of the bumper cover.

Yet another aspect of the present disclosure is an assembly for preventing pinching of a body part by a vehicle door which is provided with an energy absorbing member with a base to be fixedly secured to a bumper of a vehicle, a bracket coupled to the energy absorbing member, wherein the bracket defines a protrusion portion and a bumper cover having an inner surface defining a groove portion for engaging the protrusion portion. The bumper cover includes a flange extending outwardly from the inner surface of the bumper cover wherein the flange is capable of deforming to prevent pinching of the body part by the vehicle door when the body part is in contact with the bumper cover.

BRIEF DESCRIPTION OF THE DRAWINGS

For simplicity and clarity of illustration, the drawing and/or figures illustrate the general manner of construction of a motor vehicle and components thereof. Descriptions and details of well known features and techniques may be omitted to avoid unnecessarily obscuring the disclosure.

For detailed understanding of the present disclosure, references should be made to the following detailed description of the several aspects, taken in conjunction with the accompanying drawings, in which like elements have been given like numerals and wherein.

DETAILED DESCRIPTION

Before the present apparatus and assembly are described, it is to be understood that this disclosure is not limited to the particular apparatus and assembly described, as such may vary. One of ordinary skill in the art should understand that the terminology used herein is for the purpose of describing possible aspects, embodiments and/or implementations only, and is not intended to limit the scope of the present disclosure which will be limited only by the appended claims. For example, to one of ordinary skill in the art, it will be readily apparent that the vehicle bumper assembly as discussed herein may be implemented in a variety of ways, and that the forgoing discussion of certain of these implementations does not necessarily represent a complete description of all possible implementations.

It must also be noted that as used herein and in the appended claims, the singular forms "a," "and," and "the" may include plural referents unless the context clearly dictates otherwise. Thus, for example, reference to "a rib" may refer to one or multiple ribs, and reference to "a method of preventing" includes reference to equivalent steps and methods known to those skilled in the art, and so forth.

The present disclosure provides an improved vehicle bumper assembly which may reduce or eliminate the occurrence of the pinching of an object or body part against a vehicle door. The assembly disclosed herein is intended to protect an individual from experiencing a hand or finger pinch upon closing a rear or trunk door of a vehicle.

Figure 1:
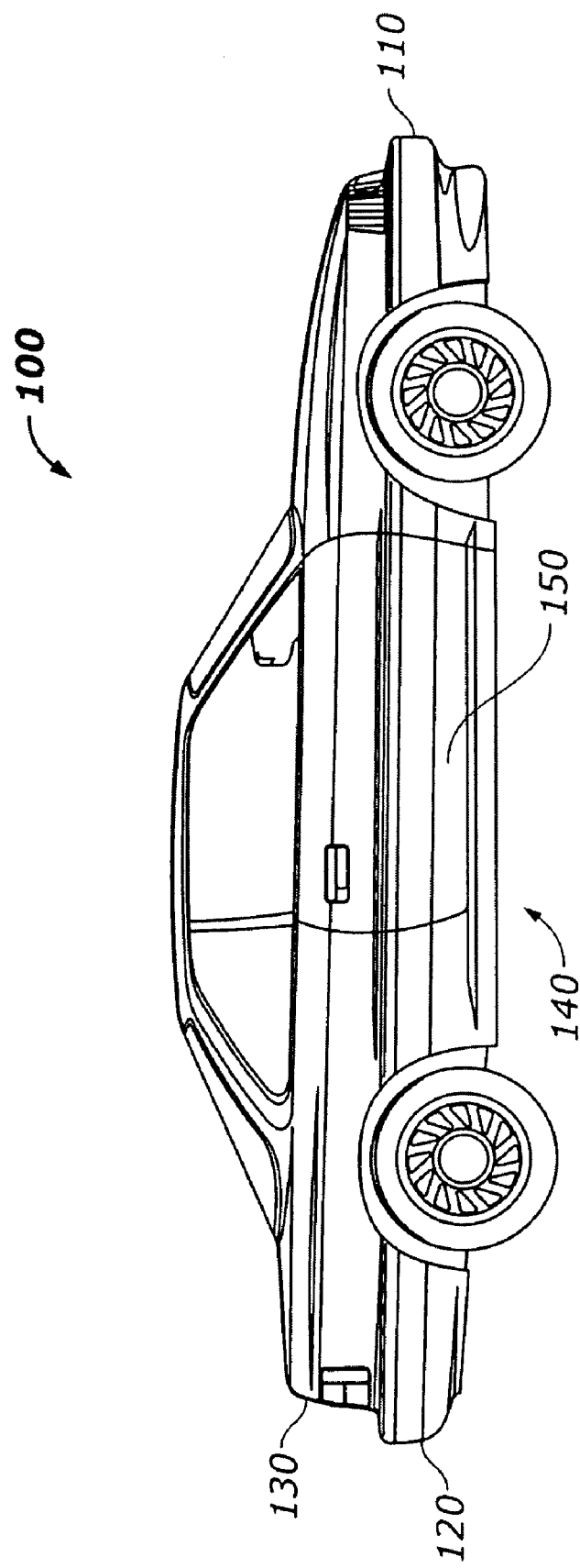
FIG. 1 represents an illustrative schematic of one embodiment of a motor vehicle.

Beginning with FIG. 1, an illustrative schematic is provided of one embodiment of a motor vehicle generally indicated at 100. The vehicle may have a body 140 serving as a structural frame which includes a driver/passenger door 150, a rear door 130, a front bumper 110 and rear bumper 120. The rear door 130, such as a trunk door, may be in a position (i.e., closed) so as to be in contact with the rear bumper 120. For purposes of illustration only, the discussion below may pertain to the rear bumper 120 and rear door 130 of a sport utility vehicle (SUV) in which a downward movement of the rear door 130 to a closing position may result in obstruction by an object or body part (e.g., finger) of an individual. A vehicle 100 may include various components, some of which are described herein, and additional components not described.

Thus, a vehicle 100 is not meant to be limited to the embodiment or components shown or discussed in the present disclosure.

Figure 2:
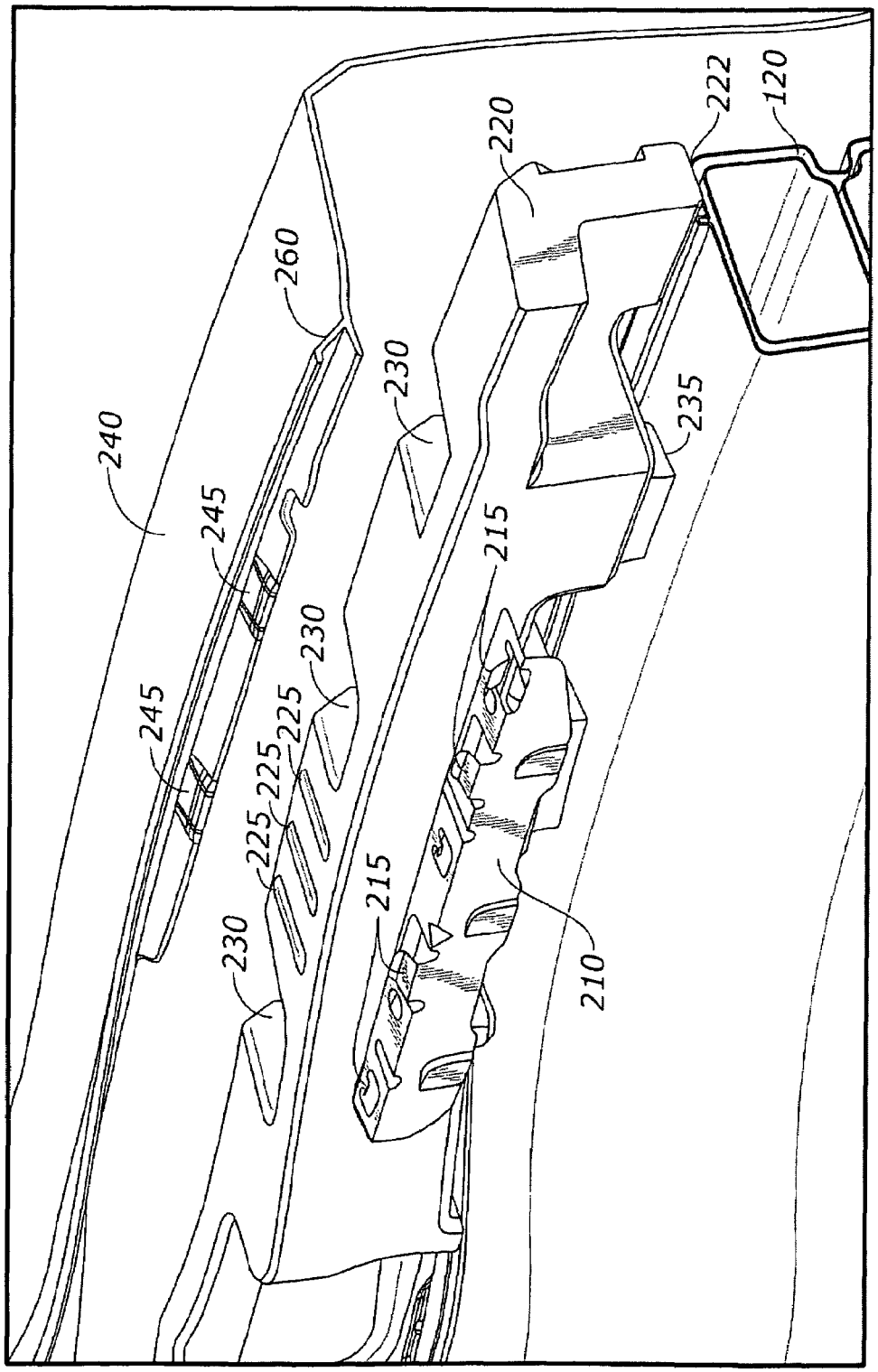
FIG. 2 represents an isometric view of one embodiment of a vehicle bumper assembly.

A vehicle bumper assembly according to one embodiment of the present disclosure will be described in detail below with reference to FIGS. 2-5. Referring now to FIG. 2, an isometric view of a vehicle bumper assembly is shown. The bumper assembly includes a bumper cover 240 having a flange 260 which extends outwardly from the inner surface of the bumper cover 240. The bumper cover 240 further includes at least one groove portion 245 disposed within the flange 260. The bumper assembly also includes a bracket 210 fixedly secured to the vehicle's body. The bracket 210 includes a protrusion portion 215 to fixedly secure the bracket 210 to the bumper cover 240 at a point on the flange 260. In one possible implementation, a protrusion portion 215 fixedly secures the bracket 210 to the bumper cover 240 at a groove portion 245. The energy absorbing member 220, mounted or fixedly secured to a rear bumper 120 at a bumper attachment point 222 and base 235, may define a plurality of recess portions 230 and include a plurality of raised reinforcement ribs 225.

Typically, a bumper cover 240 may provide a structural form to the vehicle 100 while absorbing impact experienced at either end of the vehicle during a collision. The bumper cover 240 may be made from a thermoplastic material including, but not limited to polypropylene and polyethylene, and having a generally convex curved shape. The bumper cover 240 may be arranged at a particular site on a front or rear of a vehicle body 140 so as to extend in the vehicle width direction. Any conventional means of mounting or fixedly securing the bumper cover 240 to the vehicle bumper 110, 120 may be utilized.

As part of the vehicle bumper assembly of the present disclosure, an energy absorbing member 220 is provided along the vehicle width direction. The energy absorbing member 220 may be formed of a resilient olefin type synthetic material such as foam polypropylene or the like, in any suitable form (e.g., beads). To conform to the internal surface shape of a bumper cover 240 to which it is to be fitted, the energy absorbing member 220 may assume a convex curved shape, as shown, or any suitable shape corresponding to the internal surface of the bumper cover 240.

Figure 3:
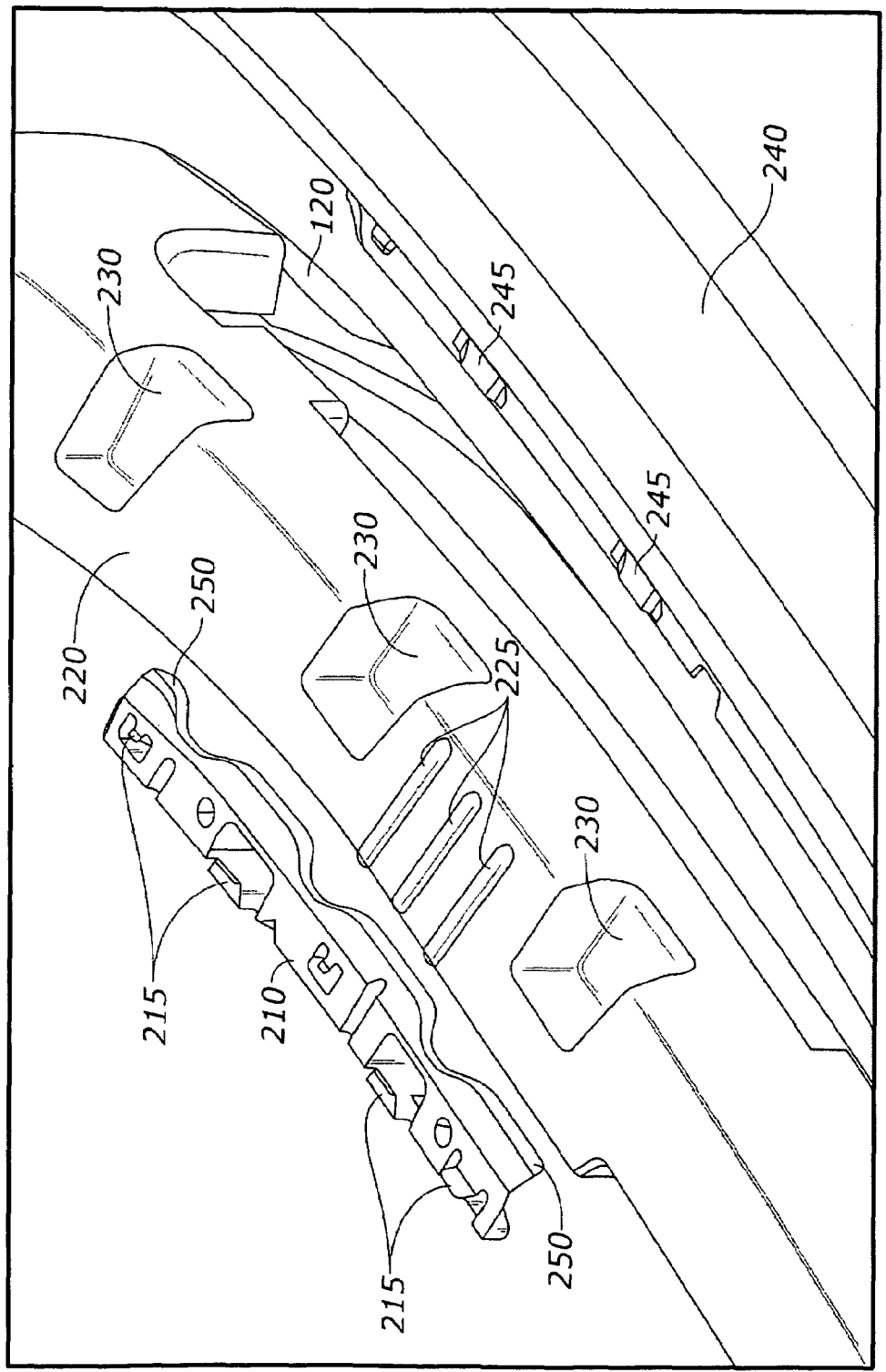
FIG. 3 represents an exploded perspective view of the vehicle bumper assembly in FIG. 2.
Figure 4:
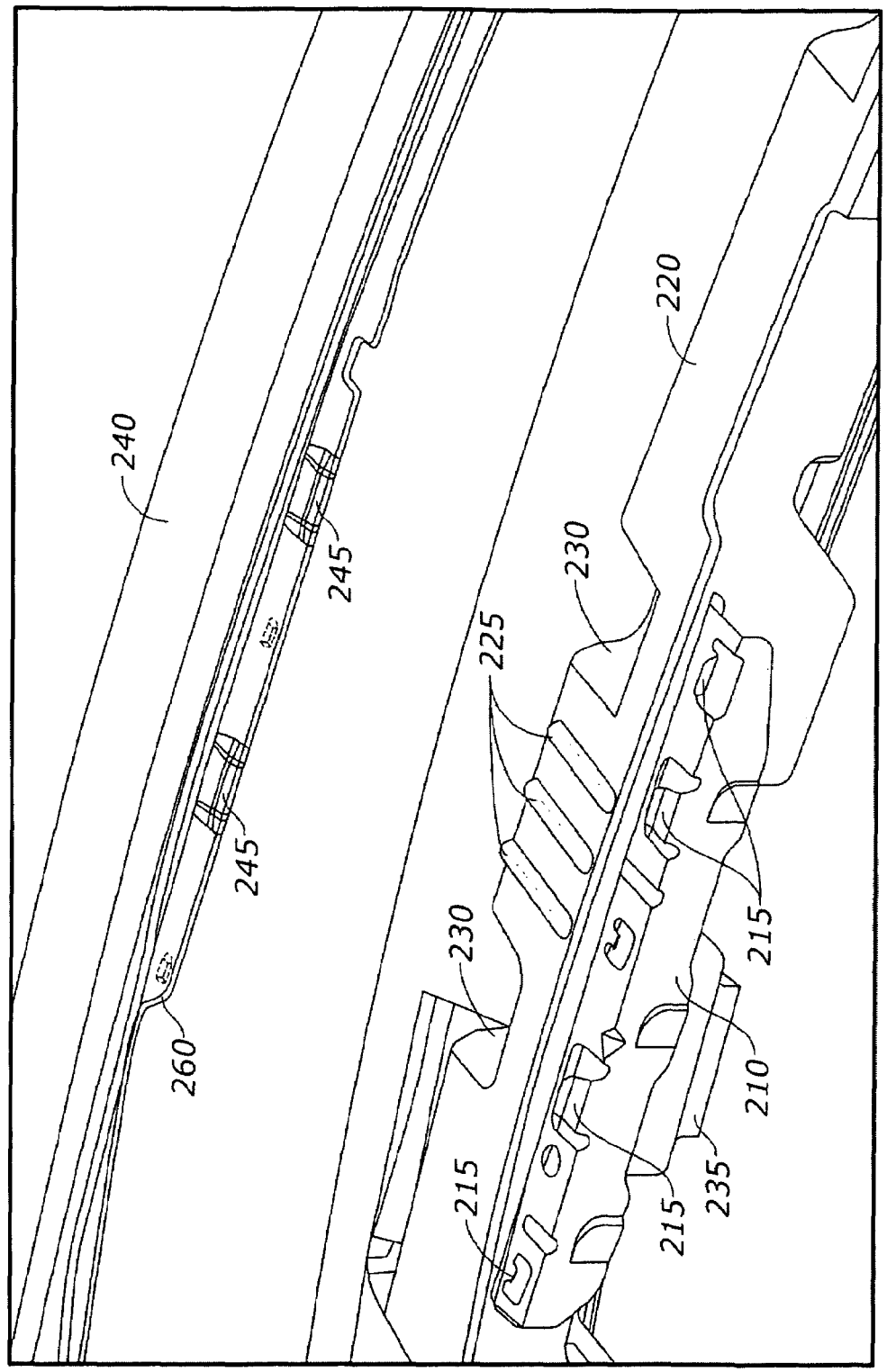
FIG. 4 represents an enlarged view of the vehicle bumper assembly in FIG. 2.

As shown in FIGS. 2-4, at several regions between the left and right ends of the energy absorbing member 220 are a plurality of recess portions 230. The recess portions 230 are formed with predetermined intervals therebetween along the vehicle width direction. As shown, the recess portions 230 appear as cutout square forms but can be any suitable shape to conform to the inner surface of the bumper cover 240.

A reinforcement rib 225 is provided on a surface of the energy absorbing member 220 opposite to the surface onto which it can be attached or mounted to the bumper 120 via a base 235. The rib 225 may be projected to a specified height to be in contact with the inner surface of the bumper cover 240 in the event of a load or pressure applied downward to the top surface of the bumper cover 240. Any number of ribs 225 may be disposed on the energy absorbing member 220 although three are depicted in FIGS. 2-4. Possibly an extension of the energy absorbing member 220, a rib 225 may also be formed from any resilient olefin type synthetic material such as foam polypropylene or the like, in any suitable form (e.g., beads). The shape of a rib 225 may depend on the design of the bumper cover 240 and may assume any shape to conform to the inner surface of the bumper cover 240. It should, therefore, be readily appreciated that the generally cylindrical shape of a rib 225 as seen in FIGS. 2-4 may instead be spherical or any suitable shape. Further, the rib 225 may be located on any portion of the energy absorbing member 220 so as to be in contact with the inner surface of the bumper cover 240.

A bracket 210, shown fixedly secured to the vehicle's body, may include slots and protrusion portions 215. Protrusion portions 215 are integrally provided at a plurality of points along the longitudinal edge of the bracket 210, separated by intervals, along the surface which may engage with the inner surface of a bumper cover 240. Engagement of a protrusion portion 215 with the bumper cover 240, particularly with the groove portion 245 or flange 260, may involve contacting, latching or inserting the protrusion portion 215 through the bumper cover 240. The protrusion portions 245 may protrude in an upward or vehicle up direction. Ends of the protrusion portions 215 are capable of bending to any suitable height above the surface of the bracket 210 to be engaged with the groove portion 245 of the bumper cover 240.

As shown in FIGS. 2-5, the end of the protrusion portion 215 may be shaped as a clip or generally having a u-shape cross section. However, it is understood that the protrusion portion 215 may take the form of any shape or may use any conventional fastening structure to allow engagement with the bumper cover's groove portion 245 of the flange 260. As previously mentioned, the end of the protrusion portion 215 may be adapted to extend to any suitable height to be inserted through a groove portion 245 formed in the bumper cover 240. In particular, the end of the protrusion portion 215 may latch onto an edge of the groove portion 245 to fixedly secure the bracket 210 to the bumper cover 240. The bracket 210 and protrusion portion 215, having high rigidity, may be formed from any bendable rigid material such as metal or the like. The protrusion portions 215 are generally rigid, but will bend or flex in any direction for engaging with a groove portion 245 of a bumper cover.

Referring now to FIG. 3, an exploded perspective view of the vehicle bumper assembly in FIG. 2 is shown. Similar to FIG. 2 described above, the bumper assembly provides a bumper cover 240 with at least one groove portion 245. The bumper assembly also includes a bracket 210 having protrusions portions 215 disposed thereon which is shown detached from the energy absorbing member 220. The energy absorbing member 220, shown here detached but typically mounted or fixedly secured to a rear bumper 120, may define a plurality of recess portions 230 and include a plurality of raised reinforcement ribs 225.

Figure 5:
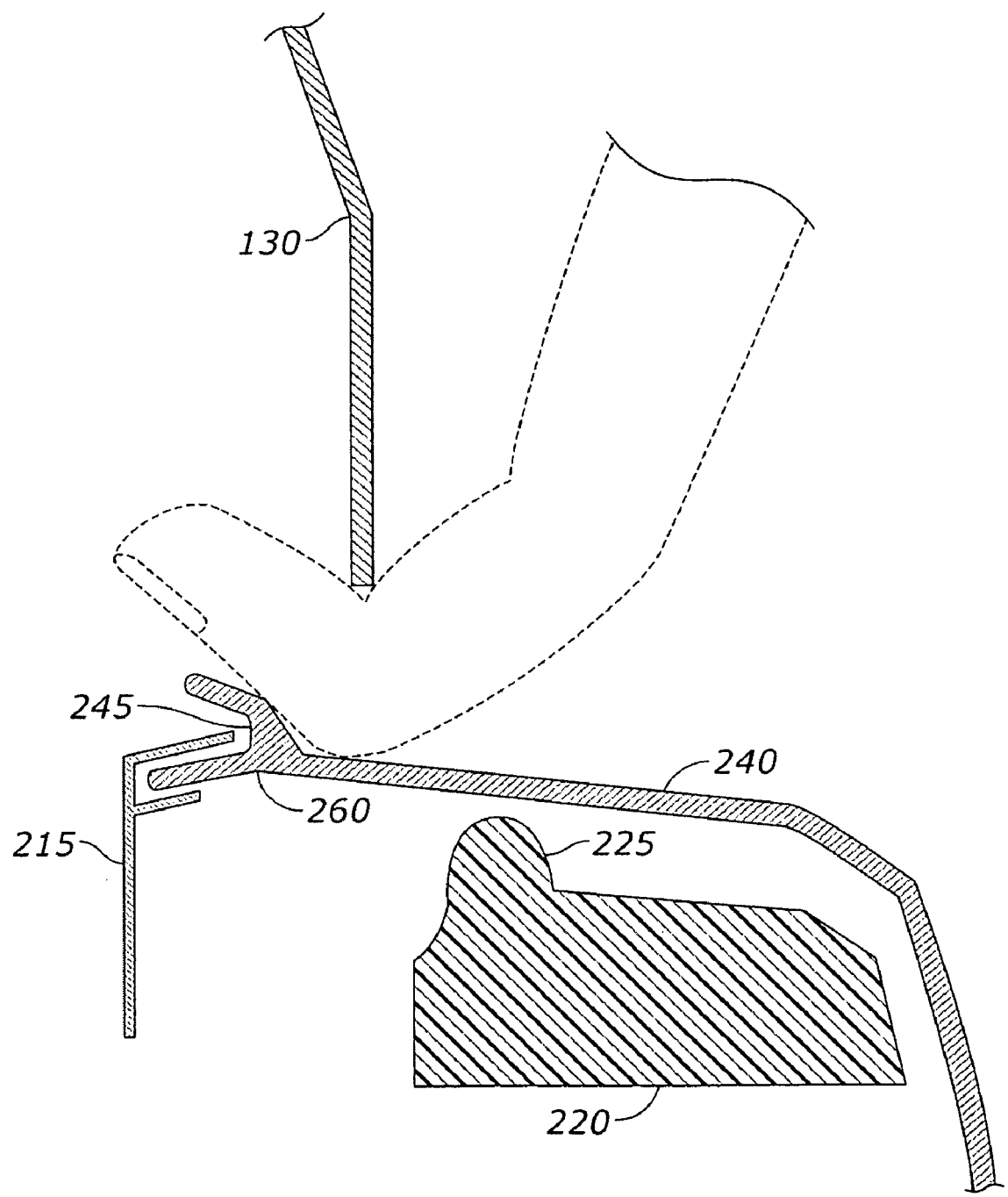
FIG. 5 represents a cross sectional view of the vehicle bumper assembly in FIG. 2.

Referring now to FIG. 4 in which an enlarged view of the vehicle bumper assembly in FIG. 2 is shown. As previously mentioned, the bumper assembly provides a bracket 210 having protrusion portions 215 disposed thereon whereby the bracket 210 is mounted or fixedly secured to the vehicle's body. The cross section of a protrusion portion 215 is generally unshaped in form, as can be seen in FIG. 5. The energy absorbing member 220 may define a plurality of recess portions 230 and include a plurality of raised reinforcement ribs 225, shown here with a generally cylindrical shape.

FIG. 5 represents a cross sectional view of the vehicle bumper assembly in FIG. 2. A rear door 130 is shown in a downward position with a body part, (e.g., finger) shown in dashed lines, obstructing the closing of the rear door 130 against the bumper cover 240. On one end of the bumper cover 240 is a flange 260 with a groove portion 245 into which a protrusion portion 215 of a bracket (not shown) may be engaged. The energy absorbing member 220 with a reinforcement rib 225 is shown on the underside of the bumper cover 240. In the case of a conventional vehicle lacking the vehicle bumper assembly herein described, an individual may experience the pinching of his hand or finger between a rear door and bumper cover upon the closing of the rear door. The assembly of the present disclosure may alleviate the occurrence of the pinching of a body part by providing an energy absorbing member 220 fixedly secured to a bracket which may be engaged with a bumper cover 240 and a flange 260 which reliably deforms, thus preventing the pinching of the body part. The ends of the protrusion portions 215 are also capable of elastically deforming along with the bumper cover 240 and flange 260 upon the insertion of an obstruction or body part. The protrusion portions 215, bumper cover 240 or flange 260 can reliably deform without affecting the surrounding bracket or energy absorbing member 220.

Particular embodiments and/or implementations of the present disclosure have been described in detail. However, the present disclosure is not limited to these embodiments and/or implementations, and it is understood by one skilled in the art that various other embodiments and/or implementations are possible within the scope of the present disclosure. For example, the protrusion portions 215 may be formed having a y-shape or other shape cross section so as to engage with the flange 260 of the bumper cover 240. Further, the recess portions 230 may be substantially circular in shape or have any other conventional shape to allow the energy absorbing member 220 to conform to the inner surface of the bumper cover 240. above and figures herein, the protrusion portions 215 have a u-shaped cross section and the recess portions 230 along the energy absorbing member 220 are square forms.

Thus, modifications and variations may be made without departing from the spirit and scope of the claimed subject matter in the present disclosure. Such changes in form and detail, including use of equivalent functional and/or structural substitutes for elements described herein, fall within the scope of the appended claims and are intended to be covered by this disclosure.

What is claimed is:

1. A vehicle bumper assembly comprising:
a bumper cover attachable to a body of a vehicle, the bumper cover having an inner surface defining a groove portion;
an energy absorbing member with a base to be fixedly secured to a bumper of the vehicle; and
a bracket coupled to the body of the vehicle, the bracket defining a protrusion portion to engage with the groove of the bumper cover.

2. The assembly of claim 1, wherein the bumper cover comprises a flange extending outwardly from the inner surface, the flange capable of deforming to prevent pinching of a body part against a vehicle door when the body part is in contact with the vehicle door.

3. The assembly of claim 2, wherein the flange has a generally y-shaped cross section.

4. The assembly of claim 1, wherein the protrusion portion forms a clip on one end to fixedly secure the bracket to the bumper cover.

5. The assembly of claim 1, wherein the bumper cover and energy absorbing member are formed of a material selected from polypropylene and polyethylene.

6. The assembly of claim 1, further comprising a rib disposed on the energy absorbing member, the rib providing a point of contact between the bumper cover and the energy absorbing member.

7. The assembly of claim 6, wherein the rib has an elongated cylindrical shape.

8. A vehicle comprising:
a body forming a bumper;
a bumper cover having an inner surface defining a groove portion, the bumper cover in contact in with an outer surface of the bumper;
an energy absorbing member with a base to be fixedly secured to the bumper; and
a bracket coupled to the body, the bracket defining a protrusion portion to engage with the groove portion of the bumper cover.

9. The vehicle of claim 8, wherein the bumper cover comprises a flange extending outwardly from the inner surface of the bumper cover, the flange capable of deforming to prevent pinching of a body part against a vehicle door when the body part is in contact with the vehicle door.

10. The assembly of claim 9, wherein the flange has a generally y-shaped cross section.

11. The vehicle of claim 8, wherein the protrusion portion forms a clip on one end to fixedly secure the bracket to the bumper cover.

12. The vehicle of claim 8, wherein the bumper cover and energy absorbing member are formed of a material selected from polypropylene and polyethylene.

13. The vehicle of claim 8, further comprising a rib disposed on the energy absorbing member, the rib providing a point of contact between the bumper cover and the energy absorbing member.

14. The vehicle of claim 8, wherein the rib has an elongated cylindrical shape.

15. An assembly for preventing pinching of a body part by a vehicle door, the assembly comprising:
an energy absorbing member with a base to be fixedly secured to a bumper of a vehicle;
a bracket coupled to a body of a vehicle, the bracket defining a protrusion portion; and
a bumper cover having an inner surface defining a groove portion for engaging the protrusion portion, wherein the bumper cover comprises a flange extending outwardly from the inner surface of the bumper cover, the flange capable of deforming to prevent pinching of the body part by the vehicle door when the body part is in contact with the vehicle door.

16. The assembly of claim 15, wherein the flange has a generally y-shaped cross section.

17. The assembly of claim 15, wherein the protrusion portion forms a clip on one end to fixedly secure the bracket to the bumper cover.

18. The assembly of claim 15, wherein the bumper cover and energy absorbing member are formed of a material selected from polypropylene and polyethylene.

19. The assembly of claim 15, further comprising a rib disposed on the energy absorbing member, the rib providing a point of contact between the bumper cover and the energy absorbing member.

20. The assembly of claim 19, wherein the rib has an elongated cylindrical shape.

* * * * *